US006080491A

United States Patent [19]

Takaki et al.

[11] Patent Number: 6,080,491

[45] Date of Patent: Jun. 27, 2000

[54] SUBSTRATE FOR ELECTROPHOTOGRAPHIC PHOTOCONDUCTOR AND ELECTROPHOTOGRAPHIC PHOTOCONDUCTOR USING THE SAME

[75] Inventors: Ikuo Takaki; Hidetaka Yahagi, both of Kawasaki; Masaaki Sakaguchi, Osaka; Yutaka Nakagishi, Osaka; Osamu Kimura, Osaka, all of Japan

[73] Assignee: Fuji Electric Co., Ltd., Kawasaki, Japan

[21] Appl. No.: 09/112,198

[22] Filed: Jul. 9, 1998

[30] Foreign Application Priority Data

Jul. 16, 1997 [JP] Japan .................................... 9-191150

[51] Int. Cl.$^{7}$ .............................. B32B 9/00; C23C 22/82; C25D 11/18

[52] U.S. Cl. ....................... 428/472.2; 148/272; 148/275; 148/900; 205/203

[58] Field of Search .................................... 428/457, 550, 428/469, 472.2; 427/419.1, 438, 523, 529, 528, 585; 148/33.2, 675, 688, 900, 243, 239, 272, 275, 535, 273; 205/203, 204

[56] References Cited

U.S. PATENT DOCUMENTS

| | | | |
|---|---|---|---|
| 3,897,287 | 7/1975 | Meyer et al. | 156/22 |
| 4,647,347 | 3/1987 | Schoener et al. | 204/37.6 |
| 4,648,911 | 3/1987 | Gruninger | 148/6.27 |
| 4,756,771 | 7/1988 | Brodalla et al. | 148/6.1 |
| 5,723,241 | 3/1998 | Ueda | 430/58 |

FOREIGN PATENT DOCUMENTS 407084391 3/1995 Japan .

*Primary Examiner*—Deborah Jones
*Assistant Examiner*—Stephen Stein
*Attorney, Agent, or Firm*—Venable; Robert J. Frank; Catherine M. Voorhees

[57] ABSTRACT

A substrate for an electrophotographic photoconductor having an anodic oxidation film on the surface is subjected to two-step sealing treatment in which the substrate is sealing treated with nickel fluoride as a sealing agent, and then with nickel acetate as a sealing agent. Therefore, an electrophotographic photoconductor using the substrate for an electrophotographic photoconductor is small in charge potential difference between the first turn and the second turn and after, and does not generate a fogged image defect or the like even without preliminary charging before printing.

21 Claims, 1 Drawing Sheet

SUBSTRATE FOR ELECTROPHOTOGRAPHIC PHOTOCONDUCTOR AND ELECTROPHOTOGRAPHIC PHOTOCONDUCTOR USING THE SAME

This application is based on Patent Application No. 09-191,150 filed Jul. 16, 1997 in Japan, the content of which is incorporated hereinto by reference.

BACKGROUND OF THE INVENTION

1. Field of the Invention

The present invention relates to an aluminum substrate for an electrophotographic photoconductor, where a surface thereof is covered with an anodized aluminum film. Also, the present invention relates to an electrophotographic photoconductor using the aluminum substrate.

2. Description of the Related Art

Heretofore, technical advances in electrophotography have been made in the field of copier machines and recently have been applied in the field of laser printers and so on. The laser printers provide excellent image qualities and allow high speed and quiet printing operations in comparison with those of the conventional impact printers. Thus, most of the present recording devices, such as printers and copiers, adopt the electrophotographic technologies. A photoconductor to be provided in each of those recording devices is prepared by forming a photoconductive layer on a conductive substrate. Inorganic materials (e.g., selenium, zinc oxide, arsenic-selenium alloy, and cadmium sulfide) have been used for the conventional photoconductive layers. Recently, however, most of the photoconductive layers are prepared by using organic materials instead of inorganic materials because of:

(1) a wide choice of the organic materials;

(2) an advantage in total expenditure including manufacturing costs;

(3) the possibility of obtaining a novel photoconductor having excellent properties which are far superior to those of the inorganic one; and so on.

It is now common practice to make a photoconductor as a structure having functionally separated layers. That is, as shown in FIG. 2, the photoconductor comprises an under-coating layer 2, a charge-generation layer 3, and a charge-transport layer 4, which are stacked on a substrate 1 in that order. A single-layered type structure shown in FIG. 1 is used in some rare cases, where a layer 5 formed on a substrate 1 performs a double function.

For preparing the photoconductor having the functionally separated layers, materials to be applied on a surface of the substrate to form the under-coating layer as a first layer may be grouped into two types. The first one includes resin materials such as polyamide and melamine resins and the second one includes materials that make an anodized aluminum film on an aluminum substrate by means of anodic oxidation. In general, the latter type is more reliable under the conditions of high temperature and high humidity.

In the current trend of advanced information technology, the need for a multi-functional copier have been increased. The multi-functional copier may have a plurality of functions such as a facsimile function and a printer function in addition to a function of the conventional copier. Therefore, a digital copier is becoming a leading part as a multi-functional copier in the current trend of advanced information technology. The digital copier is designed to combine the conventional analog copier technology with the technologies of laser printer, LED printer, and so on, permitting the digitization of images.

Various materials can be considered in a photoconductor to be used in the laser printer or the LED printer. Among them, phthalocyanines are selected as materials of exceedingly sensitive to wavelengths generated by the laser and the LED, and thus they are often used in a charge-generation layer. Generally, the phthalocyanines are chemically stable, easy to synthesize, and obtainable at a comparatively low cost.

Using the known digital copier, where a photoconductor comprises phthalocyanine in its charge-generation layer, causes problems with a developed photographic image. A fog can be observed on the image after the first rotation of the photoconductor in the digital copier, while this kind of the trouble is almost trivial in the case of using the conventional laser or LED printer. Comparing with the results of the first rotation, furthermore, we can confirm that this kind of deficient image quality is reduced after the second rotation and substantially eliminated after the third rotation of the photoconductor.

The digital copier adopts a reverse development scheme which is generally used in the laser printers and the LED printers, so that it has been confirmed that the fogged image after the first rotation is substantially due to an electrostatic charge failure of the photoconductor.

Comparing with the results of the first rotation of the photoconductor before and after the process of continuously making about 100,000 copies of a predetermined material to experience electrical fatigue and letting it stand for about 30 to 60 minutes, the severity of the fog after the process becomes more worse than the severity of the fog before the process.

In laser printers and LED printers, we can observe the phenomenon of generating the potential difference between the charge potential at the first rotation and the charge potential at the second or later rotation. Thus, it is possible to redesign the process so that any rotations except the first one responsible for an image formation. In order to fill market needs for speeding up the first copy, accelerating the recovering time from a power-saving mode, and so on, there is the demand for designing the process so as to include the step of forming an image as a result of the first rotation. In this case, however, some modifications including a preliminary charging may be made. For attaining such a process design, however, the best possible solution is to reduce the difference between the potential at the first rotation and the potential at the second rotation in the photoconductor from the viewpoint of cost advantage and device simplification.

SUMMARY OF THE INVENTION

An object of the present invention is to provide an electrophotographic photoconductor in which the difference between a charge potential at the first rotation and a charge potential at the second or later rotation is negligibly small and, as a result, a fog or the like is not generated even without performing a preliminary charging before the process of image formation.

In a first aspect of the present invention, there is provided a method for making a substrate for an electrophotographic photoconductor comprising the steps of:

forming an anodic oxidation film on the surface of an aluminum substrate;

performing a first sealing treatment with nickel fluoride as a sealing agent at a specific temperature to the aluminum substrate with the anodic oxidation film formed thereon; and performing a second sealing treatment with nickel acetate as a sealing agent at a specific temperature to the aluminum substrate with the anodic oxidation film formed thereon and treated by the first sealing treatment with nickel fluoride as a sealing agent.

Here, concentration of the sealing agent comprising nickel fluoride may be 0.8 to 20 g/l, preferably 1.2 to 10 g/l.

The specific temperature in the first sealing treatment may be 10 to 35° C., preferably 20 to 30° C.

Concentration of the sealing agent comprising nickel acetate may be 1.5 to 15 g/l, preferably 5.0 to 10 g/l.

The specific temperature in the second sealing treatment may be 70 to 95° C., preferably 80 to 90° C.

In a second aspect of the present invention, there is provided a substrate for an electrophotographic photoconductor, comprising:

an aluminum substrate; and an anodic oxidation film formed on the aluminum substrate;

wherein the aluminum substrate with the aluminum anodic oxidation film formed thereon is treated by a first sealing treatment with nickel fluoride as a sealing agent and then treated by a second sealing treatment with nickel acetate as a sealing agent.

Here, concentration of the sealing agent comprising nickel fluoride may be 0.8 to 20 g/l, preferably 1.2 to 10 g/l.

The first sealing treatment may be performed at a temperature of 10 to 35° C., preferably 20 to 30° C.

Concentration of the sealing agent comprising nickel acetate may be 1.5 to 15 g/l, preferably 5.0 to 10 g/l.

The second sealing treatment may be performed at a temperature of 70 to 95° C., preferably 80 to 90° C.

In a third aspect of the present invention, there is provided an electrophotographic photoconductor having at least a substrate and a photosensitive layer laminated on the substrate, wherein the substrate comprises an aluminum substrate, the aluminum substrate having an anodic oxidation film formed thereon, the aluminum substrate with the anodic oxidation film being treated by a first sealing treatment with nickel fluoride as a sealing agent, and then treated by a second sealing treatment with nickel acetate as a sealing agent.

Here, concentration of the sealing agent comprising nickel fluoride may be 0.8 to 20 g/l, preferably 1.2 to 10 g/l.

The first sealing treatment may be performed at a temperature of 10 to 35° C., preferably 20 to 30° C.

Concentration of the sealing agent comprising nickel acetate may be 1.5 to 15 g/l, preferably 5.0 to 10 g/l.

The photosensitive layer may contain phthalocyanine as a charge generation substance.

The above and the other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
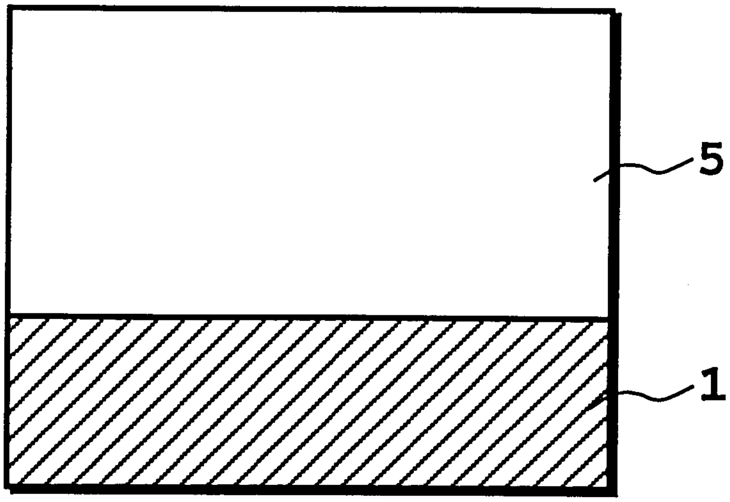
FIG. 1 is a schematic sectional view of an embodiment of a single-layer type electrophotographic photoconductor in accordance with the present invention.

A substrate for electrophotographic photoconductor and a photoconductor using such a substrate of the present invention will be described in detail.

The substrate for electrophotographic photoconductor of the present invention can be obtained by the process of properly performing sealing treatments after applying an anodic oxidation process on an aluminum-base material. The anodic oxidation process deposits an oxidized aluminum film on the material and can be carried out by, for example, the process including the steps shown in Table 1.

TABLE 1

| Step No. | Details | Treatment time | Liquid temp (° C.) | Chemical used | Conc. (g/l) |
|---|---|---|---|---|---|
| 1 | Degreasing | 4.0 min | 60 | Degreasing agent (e.g. TOPAL-CLEAN 101) | 30 |
| 2 | Water washing | 1.0 min | | Pure water | |
| 3 | Water washing | 1.0 min | | Pure water | |
| 4 | Neutralization | 1.0 min | | Nitric acid | 70 |
| 5 | Water washing | 1.0 min | | Pure water | |
| 6 | Water washing | 1.0 min | | Pure water | |
| 7 | Anodic oxidation | 23.5 min | 20 | Sulfuric acid | 180 |
| 8 | Water washing | 1.0 min | | Pure water | |
| 9 | Water washing | 1.0 min | | Pure water | |
| 10 | Water washing | 2.5 min | | Pure water | |
| 11 | First-step pit sealing | 2.0 min | 25 | Nickel fluoride (e.g. TOP-SEAL L-100) | 2 |
| 12 | Water washing | 1.0 min | | Pure water | |
| 13 | Second-step pit sealing | 10.0 min | 85 | Nickel acetate (e.g. TOP-SEAL H298) | 8 (40 ml/l) |
| 14 | Water washing | 1.0 min | | Pure water | |
| 15 | Water washing | 1.0 min | | Pure water | |
| 16 | Water washing | 1.0 min | | Pure water | |
| 17 | Hot water washing | 2.0 min | 65 | Pure water | |
| 18 | Drying | 4.0 min | 70 | Hot air drying | |

The process includes two sealing treatments: Step No. 11 and Step No. 13 in Table 1. The first-step sealing treatment (Step No. 11) is performed using nickel fluoride as a sealing agent. The concentration of nickel fluoride is preferably 0.8 to 20 g/l, more preferably 1.2 to 10 g/l at a temperature of preferably 10 to 35° C., more preferably 20 to 30° C. On the other hand, the second-step sealing treatment (Step No. 13) is performed using nickel acetate as a sealing agent. The concentration of nickel acetate is preferably 1.5 to 15 g/l, more preferably 5.0 to 10 g/l at a temperature of preferably 70 to 95° C., more preferably 80 to 90° C. If the sequence of these sealing treatments is reversed, the resulting photoconductor does not show any advantage of the present invention because it has poor electrical properties and provides an image with visual defects, such as fog or the like. If an additional sealing treatment with pure water at 80 to 90° C. for 5 to 20 minutes is performed after the nickel fluoride sealing (i.e., double-sealing treatment), another problem is caused when these steps are performed in the commercial-scaled continuation process. The problem is that a water bath for the sealing treatment using pure water tends to be contaminated with the other agents and so on, leading to the generation of image defects such as fog. Thus, the double sealing treatment cannot attain the advantages of the present invention.

We are now describing an electrophotographic photoconductor as a preferred embodiment of the present invention. The photoconductor uses the substrate described above as a substrate.

Figure 2:
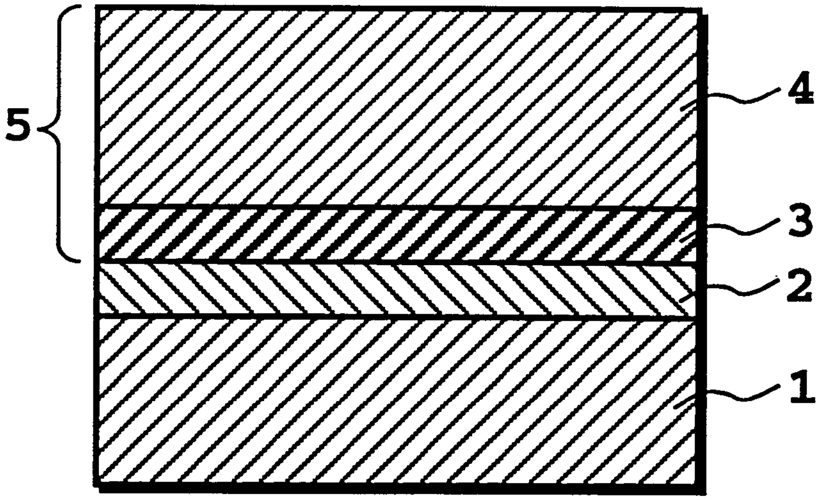
FIG. 2 is a schematic sectional view of an embodiment of a negative-charged electrophotographic photoconductor in the type of having a laminated structure of functionally-divided layers in accordance with the present invention.

The photoconductor of the present embodiment may be of having a structure of single-layer type or functionally-divided layer type. The former structure is shown in FIG. 1, while the latter structure is shown in FIG. 2. Each of the photoconductor in the figures has a photosensitive layer 5 on a substrate 1. In FIG. 2, however, the photosensitive layer 5 is further divided into functionally different layers. In the following, only a negative-charged photoconductor with a functionally-divided photosensitive layer will be described in detail. However, it is needless to say that it will become apparent to those skilled in the art that the respective detailed description is applicable also to the single-layer type photoconductor shown in FIG. 1.

Referring again to FIG. 2, the negative-charged photoconductor is in the type of having a functionally-divided layer structure. The photosensitive layer 5 is laminated on the substrate 1 through an undercoating layer 2 and consists of a charge generation layer 3 and a charge transport layer 4 which are laminated in that order, resulting in a functionally-distinguished multi-layer structure.

The substrate 1 acts as an electrode of the photoconductor and simultaneously as a substrate of other respective layers. The substrate 1 is provided as an aluminum substrate which may be any of cylindrical, plate, and film forms. The aluminum substrate has an anodized aluminum film on its surface.

The charge generation layer 3 may be formed by vacuum deposition of an organic photoconductive substance or by coating a material that contains particles of organic photoconductive substance dispersed in a resin binder. The charge generation layer 3 is responsible for receiving light to generate electric charges. It is important that the charge generation layer 3 has the high efficiency of charge generation and simultaneously has the desirable charge injection properties into the charge transport layer 4, that is, the charge injection is to exhibit small electrical field dependence and to be efficient even at low electrical field. A charge generation substance of the charge generation layer 3 may be selected from the group consisting of metal-free phthalocyanine compounds; phthalocyanine compounds having, at their center, a metal such as tin, zinc, or copper, or an oxide of one of these metals, or a metal coordinated with chlorine atom or the like. Among these substance, a suitable one can be selected according to the wavelength band of exposure light source for image formation and to the photosensitivity required for the photoconductor. The amount of the phthalocyanine compound to be used is 5 to 500 parts by weight, preferably 10 to 100 parts by weight, with respect to 10 parts by weight of the resin binder.

Since the charge generation layer 3 is sufficient to have only a charge generation function, the film thickness is generally within a range to obtain a necessary photosensitivity and is designed as thin as possible, generally less than 5 $\mu$m, preferably less than 1 $\mu$m. The charge generation layer 3 mainly comprises a charge generation substance which can be mixed with a charge transport substance or the like. As a binder for the charge generation layer, such polymers as polycarbonate, polyester, polyurethane, polyamide, epoxy, polyvinylbutyral, phenoxy, silicone, methacrylic ester, or copolymers thereof, and halogenated or cyanoethylated compounds thereof can be used in appropriate combinations.

The charge transport layer 4 is a coated film comprising an organic charge transport substance dispersed in a resin binder. The charge transport layer 4 maintains the charge of the photoconductor as an insulator layer in a dark place, while it transfers the charge infected from the charge generation layer when it receives light. For resin binders for the charge transport layer, polymers and copolymers of polycarbonate, polyester, polystyrene, and methacrylic ester are used, which are important to have a compatibility with charge transport substances in addition to mechanical, chemical and electrical stabilities and adhesiveness. In the charge transport layer 4, any of distyryl compounds, diamine compounds, hydrazone compounds, stilbene compounds and the like are used as a charge transport substance. The amount of the compound is 20 to 200 parts by weight, preferably 30 to 150 parts by weight, with respect to 100 parts by weight of the resin binder.

Film thickness of the charge transport layer 4 is preferably 3 to 50 $\mu$m, more preferably 15 to 40 $\mu$m, to maintain a practically effective surface potential.

For the purpose of improving sensitivity, reducing residual potential, improvement of environmental resistance or stability to harmful light, or the like, an electron accepting substance, an antioxidant, a light stabilizer, or the like can be added to the undercoating layer, the charge generation layer, and the charge transport layer as necessary.

Further, on the above photosensitive layer, a surface protective layer may be provided for the purpose of improving the environmental resistance and mechanical strength. The surface protective layer is desirably one which does not substantially disturb transmission of light.

In the following, the present invention will be described in detail with reference to the embodiments.

Embodiments 1 to 4 (Two-Step Sealing)

After a cylindrical aluminum substrate (JIS 6063 material) was cut using a lathe into desired dimensions, degreasing was carried out with a degreasing agent (TOPALCLEAN 101, 30 g/l/60° C., 2 minutes: from Okuno Chemical Industries Co., Ltd.), and thoroughly washed with water to remove the degreasing agent. After that, the aluminum substrate was subjected to anodic oxidation (current density 1.0 A/dm$^2$, electrolytic voltage 13.5 to 14.0 V) in sulfuric acid (180 g/l, 20° C., 25 minutes) to obtain an anodic oxidation film thickness of 7 $\mu$m.

A first step sealing treatment was carried out using nickel fluoride (TOP-SEAL L-100: from Okuno Chemical Industries Co., Ltd.) in a concentration of 2 g/l for 2 minutes. Then, a second step sealing treatment was carried out using nickel acetate (TOP-SEAL H298, 40 ml/l: from Okuno Chemical Industries Co., Ltd.) in 4 conditions at temperatures of 60° C., 70° C., 80° C., and 90° C. for 8 minutes.

After that, the substrate was subjected to ultrasonic washing 2 times with hot pure water and 2 times with pure water, respectively. Then, it was further subjected to hot air to obtain an aluminum substrate (hereinafter referred to as "raw cylinder") complete with formation of the anodic oxidation film.

Next, the thus obtained raw cylinder was washed with an alkaline washing agent (CASTROL 450: from Castrol Co., Ltd.) in a concentration of 2 weight %, rinsed with pure water, washed with hot pure water at 65° C., and dried. Next, as the charge generation layer, 10 parts by weight of titanyl phthalocyanine and 10 parts by weight of resin binder (polyvinyl-butyral (BM-2 from Sekisui Chemical Co., Ltd.) were dispersed in 980 parts by weight of tetrahydrofuran to obtain a coating liquid, which was dip coated and then dried at 100° C. for 30 minutes to form a charge generation layer having a film thickness of about 0.2 μm. Next, 100 parts by weight of hydrazone compound and 100 parts by weight of polycarbonate resin (TOUGHZET B-500: from Idemitsu Kosan Co., Ltd.) were dissolved in 900 parts by weight of dichloromethane to prepare a coating solution, which was dip coated and then dried at 100° C. for 60 minutes to form a charge transport layer having a film thickness of about 25 μm, thereby obtaining an organic lamination type photoconductor.

Embodiments 5 to 8 (Two-Step Sealing)

In the stage of sealing treatment in the process of forming anodic oxidation films of embodiments 5 to 8, treatment was made in the same conditions respectively as in Embodiments 1 to 4, except that concentration of nickel fluoride (TOP-SEAL L-100: from Okuno Chemical Industries Co., Ltd.) was 4 g/l in Embodiments 5–8.

was carried out with nickel fluoride (TOP-SEAL L-100: from Okuno Chemical Industries Co., Ltd.) in a concentration of 4 g/l in two conditions of for 2 minutes and 10 minutes. Other conditions were the same as in Embodiment 1.

Each of the thus prepared photoconductors was equipped on a digital copier modified for measurement of surface potential of the photoconductor, evaluated a difference in charge potential between the first turn and the second turn at an initial time and after making 100,000 copies, and the image was evaluated.

The evaluation results are shown in Table 2.

TABLE 2

| | First step pit sealing Nickel fluoride | | | Second step pit sealing Nickel acetate | | | Initial | | | | After 100,000 sheets copying | | | |
|---|---|---|---|---|---|---|---|---|---|---|---|---|---|---|
| | Temp. (° C.) | Conc. (g/l) | Time (min) | Temp. (° C.) | Conc. (g/l) | Time (min) | First turn charge pot. (V) | Second turn charge pot. (V) | Charge pot. dif. (V) | Image evaluation | First turn charge pot. (V) | Second turn charge pot. (V) | Charge pot. dif. (V) | Image evaluation |
| Em.1 | Room | 2 | 2 | 60 | 5 | 8 | −520 | −532 | 12 | good | −535 | −550 | 15 | good |
| Em.2 | Room | 2 | 2 | 70 | 5 | 8 | −540 | −551 | 11 | good | −535 | −548 | 13 | good |
| Em.3 | Room | 2 | 2 | 80 | 5 | 8 | −545 | −553 | 8 | good | −543 | −552 | 9 | good |
| Em.4 | Room | 2 | 2 | 90 | 5 | 8 | −550 | −555 | 5 | good | −540 | −550 | 10 | good |
| Em.5 | Room | 4 | 2 | 60 | 5 | 8 | −530 | −540 | 10 | good | −534 | −549 | 15 | good |
| Em.6 | Room | 4 | 2 | 70 | 5 | 8 | −540 | −549 | 9 | good | −540 | −552 | 12 | good |
| Em.7 | Room | 4 | 2 | 80 | 5 | 8 | −545 | −551 | 6 | good | −543 | −551 | 8 | good |
| Em.8 | Room | 4 | 2 | 90 | 5 | 8 | −550 | −554 | 4 | good | −544 | −549 | 5 | good |
| Co. Ex.1 | — | — | — | 60 | 5 | 8 | −510 | −551 | 41 | x | −492 | −542 | 50 | x |
| Co. Ex.2 | — | — | — | 80 | 5 | 8 | −520 | −550 | 30 | x | −500 | −545 | 45 | x |
| Co. Ex.3 | Room | 2 | 2 | — | | | −520 | −545 | 25 | x | −487 | −547 | 60 | x |
| Co. Ex.4 | Room | 2 | 10 | — | | | −520 | −550 | 30 | x | −491 | −546 | 55 | x |
| Co. Ex.5 | Room | 4 | 2 | — | | | −520 | −545 | 25 | x | −484 | −550 | 66 | x |
| Co. Ex.6 | Room | 4 | 10 | — | | | −535 | −559 | 24 | x | −500 | −549 | 49 | x |

Comparative Examples 1 and 2 (One-Step Sealing)

In the stage of sealing treatment in the process of forming anodic oxidation film, sealing treatment of only a single step was carried out with nickel acetate (TOP-SEAL H298, 40 ml/l: from Okuno Chemical Industries Co., Ltd.) in two conditions at temperatures of 60° C. and 80° C. for 8 minutes. Other conditions were the same as in Embodiment 1.

Comparative Examples 3 and 4 (One-Step Sealing)

In the stage of sealing treatment in the process of forming anodic oxidation film, sealing treatment of only a single step was carried out with nickel fluoride (TOP-SEAL L-100: from Okuno Chemical Industries Co., Ltd.) in a concentration of 2 g/l in two conditions of for 2 minutes and 10 minutes. Other conditions were the same as in Embodiment 1.

Comparative Examples 5 and 6 (One-Step Sealing)

In the stage of sealing treatment in the process of forming anodic oxidation film, sealing treatment of only a single step In the table, image evaluation results are indicated as follows.

good: fogged image defect is not observed.

x: fogged image defect is observed.

As can be seen from the above results shown in Table 2, by performing two-step sealing treatment when forming the aluminum anodic oxidation film as in Embodiments 1 to 8, a difference in potential between the first turn and second turn at the initial time and after making 100,000 copies in a digital copier was remarkably reduced to 15 V or less compared to Comparative Examples 1 to 6 performing one-step sealing treatment. Furthermore, no fogged image defect was noted in the image, thus obtaining a good result.

As described above, with the present invention, in a digital copier, difference in charge potential is small between the initial time of operation and after an actual print fatigue, and a good image is obtained without degradation of other characteristics of the photoconductor even by a process without preliminary charging.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A method for making a substrate for an electrophotographic photoconductor comprising the steps of:

forming an anodic oxidation film on the surface of an aluminum substrate;

performing a first sealing treatment with nickel fluoride as a sealing agent at a specific temperature to said aluminum substrate with said anodic oxidation film formed thereon; and performing a second sealing treatment with nickel acetate as a sealing agent at a specific temperature to said aluminum substrate with said anodic oxidation film formed thereon and treated by said first sealing treatment with nickel fluoride as a sealing agent.

2. The method as claimed in claim 1, wherein concentration of said sealing agent comprising nickel fluoride is 0.8 to 20 g/l.

3. The method as claimed in claim 2, wherein the concentration of nickel flouride is 1.2 to 10 g/l.

4. The method as claimed in claim 1, wherein said specific temperature in said first sealing treatment is 10 to 35° C.

5. The method as claimed in claim 4, wherein the specific temperature in said first sealing treatment is 20 to 30° C.

6. The method as claimed in claim 1, wherein concentration of said sealing agent comprising nickel acetate is 1.5 to 15 g/l.

7. The method as claimed in claim 1, wherein specific temperature in said second sealing treatment is 70 to 95° C.

8. The method as claimed in claim 7, wherein the specific temperature in said second sealing treatment is 80 to 90° C.

9. A substrate for an electrophotographic photoconductor, comprising:

an aluminum substrate; and an anodic oxidation film formed on said aluminum substrate;

wherein said aluminum substrate with said aluminum anodic oxidation film formed thereon is treated by a first sealing treatment with nickel fluoride as a sealing agent and then treated by a second sealing treatment with nickel acetate as a sealing agent.

10. The substrate for an electrophotographic conductor as claimed in claim 9, wherein the concentration of nickel flouride is 1.2 to 10 g/l.

11. The substrate for an electrophotographic photoconductor as claimed in claim 9, wherein concentration of said sealing agent comprising nickel flouride is 0.8 to 20 g/l.

12. The substrate for an electrophotographic photoconductor as claimed in claim 9, wherein said first sealing treatment is performed at a temperature of 10 to 35° C.

13. The substrate for an electrophotographic conductor as claimed in claim 12, wherein said first sealing treatment is performed at a temperature of 20 to 30° C.

14. The substrate for an electrophotographic photoconductor as claimed in claim 9, wherein concentration of said sealing agent comprising nickel acetate is 1.5 to 15 g/l.

15. The substrate for an electrophotographic photoconductor as claimed in claim 9, wherein said second sealing treatment is performed at a temperature of 70 to 95° C.

16. The substrate for an electrophotographic photoconductor as claimed in claim 15, wherein said sealing treatment is performed at a temperature of 80 to 90° C.

17. An electrophotographic photoconductor having at least a substrate and a photosensitive layer laminated on said substrate, wherein said substrate comprises an aluminum substrate, said aluminum substrate having an anodic oxidation film formed thereon, said aluminum substrate with said anodic oxidation film being treated by a first sealing treatment with nickel fluoride as a sealing agent, and then treated by a second sealing treatment with nickel acetate as a sealing agent.

18. The electrophotographic photoconductor as claimed in claim 17, wherein concentration of said sealing agent comprising nickel flouride is 0.8 to 20 g/l.

19. The electrophotographic photoconductor as claimed in claim 17, wherein said first sealing treatment is performed at a temperature of 10 to 35° C.

20. The electrophotographic photoconductor as claimed in claim 17, wherein concentration of said sealing agent comprising nickel acetate is 1.5 to 15 g/l.

21. The electrophotographic photoconductor as claimed in Claim 17, wherein said photosensitive layer contains phthalocyanine as a charge generation substance.

* * * * *